US009845065B2

(12) United States Patent
An et al.

(10) Patent No.: US 9,845,065 B2
(45) Date of Patent: Dec. 19, 2017

(54) KNEE BOLSTER DEVICE FOR VEHICLE

(71) Applicants: Hyundai Motor Company, Seoul (KR); Kia Motors Corporation, Seoul (KR); LG Hausys, Ltd., Seoul (KR); Hyundai Mobis Co., Ltd., Seoul (KR)

(72) Inventors: Jae Hyun An, Chungcheongnam-do (KR); Yong Han Kang, Seoul (KR); Sang Hyeon Park, Chungcheongbuk-do (KR); Young Pyo Lee, Gyeonggi-do (KR)

(73) Assignees: Hyundai Motor Company, Seoul (KR); Kia Motors Coporation, Seoul (KR); LG Hausys, Ltd., Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/282,431

(22) Filed: Sep. 30, 2016

(65) Prior Publication Data
US 2017/0274857 A1    Sep. 28, 2017

(30) Foreign Application Priority Data
Mar. 24, 2016    (KR) .......................... 10-2016-0035083

(51) Int. Cl.
*B60R 21/045*    (2006.01)
*B60R 21/00*    (2006.01)

(52) U.S. Cl.
CPC .... *B60R 21/045* (2013.01); *B60R 2021/0051* (2013.01)

(58) Field of Classification Search
CPC .................................................. B60R 21/045
See application file for complete search history.

(56) References Cited

U.S. PATENT DOCUMENTS

| 5,037,130 | A | * | 8/1991 | Okuyama | ............. | B60R 21/045 280/752 |
| 5,238,286 | A | * | 8/1993 | Tanaka | ................. | B60R 21/045 280/752 |
| 5,456,494 | A | * | 10/1995 | Witkovsky | ............ | B60R 21/045 188/377 |
| 5,518,270 | A | * | 5/1996 | Hanada | ................. | B60R 21/045 280/748 |
| 5,951,045 | A | * | 9/1999 | Almefelt | ............... | B60R 21/045 180/90 |
| 6,554,352 | B2 | * | 4/2003 | Nagy | ................... | B62D 25/145 180/90 |
| 8,465,051 | B2 | * | 6/2013 | Ha | ........................ | B60R 21/045 280/751 |

(Continued)

FOREIGN PATENT DOCUMENTS

JP    H05305850 A    11/1993
JP    2012-116437 A    6/2012

(Continued)

*Primary Examiner* — Nicole T Verley
(74) *Attorney, Agent, or Firm* — Mintz Levin Cohn Ferris Glovsky and Popeo, P.C.; Peter F. Corless

(57) ABSTRACT

A knee bolster device for a vehicle is intended to enhance passenger safety performance by minimizing injury to passengers when a collision occurs. The knee bolster device is capable of preventing injury to passengers striking a lower crash pad panel and penetrating into an inner space of the lower crash pad panel because the lower crash pad panel is reinforced by a composite material and an impact energy absorbing structure installed in the inner space of the lower crash pad panel.

7 Claims, 6 Drawing Sheets

(56) References Cited

U.S. PATENT DOCUMENTS

| | | | | |
|---|---|---|---|---|
| 8,764,102 | B2* | 7/2014 | Abe | B62D 21/15 296/193.02 |
| 9,409,606 | B2* | 8/2016 | Eshima | B62D 25/145 |
| 2003/0057760 | A1* | 3/2003 | Horsch | B60R 21/045 297/423.41 |
| 2003/0173763 | A1* | 9/2003 | Yamazaki | B60R 21/045 280/748 |
| 2005/0001416 | A1* | 1/2005 | Muramatsu | B60R 21/045 280/752 |
| 2007/0164548 | A1* | 7/2007 | Abe | B60R 21/04 280/752 |
| 2007/0222197 | A1* | 9/2007 | Makita | B60R 21/045 280/752 |
| 2008/0048425 | A1* | 2/2008 | Hayata | B60R 21/045 280/751 |
| 2009/0146405 | A1* | 6/2009 | Kawashima | B60R 21/045 280/751 |
| 2010/0117342 | A1* | 5/2010 | Kim | B60R 21/206 280/730.1 |
| 2012/0068447 | A1* | 3/2012 | An | B60R 21/045 280/752 |
| 2012/0228856 | A1* | 9/2012 | Arima | B60R 21/045 280/751 |
| 2013/0249201 | A1* | 9/2013 | Fujiwara | B60R 21/045 280/752 |
| 2014/0125043 | A1* | 5/2014 | Takai | B60R 21/045 280/748 |
| 2016/0129870 | A1* | 5/2016 | An | B60R 21/045 280/752 |
| 2017/0001589 | A1* | 1/2017 | An | B60R 21/045 |

FOREIGN PATENT DOCUMENTS

| | | |
|---|---|---|
| KR | 2005-0027544 A | 3/2005 |
| KR | 10-0537313 B1 | 12/2005 |
| KR | 2006-0007540 A | 1/2006 |
| KR | 10-0588909 B1 | 6/2006 |
| KR | 2007-0095666 A | 10/2007 |
| KR | 10-2012-0029714 A | 3/2012 |
| KR | 10-1188615 B1 | 10/2012 |

* cited by examiner

< A-A section >

< B-B section >

< C-C section >

KNEE BOLSTER DEVICE FOR VEHICLE

CROSS-REFERENCE TO RELATED APPLICATION

This application claims under 35 U.S.C. §119(a) the benefit of Korean Patent Application No. 10-2016-0035083 filed on Mar. 24, 2016, the entire contents of which are incorporated herein by reference.

BACKGROUND

(a) Technical Field

The present invention relates to a knee bolster device for a vehicle, more particularly, to a knee bolster device that is intended to enhance passenger safety performance by minimizing injury to passengers when a collision occurs.

(b) Description of the Related Art

In general, when a vehicle is involved in a collision, passengers in the vehicle may be pushed toward a front crash pad by inertia.

Therefore, vehicles are basically equipped with air bags, seat belts and the like as passenger safety devices for protecting passengers from an accident.

However, although the upper part of the abdomen of the passenger's body can be protected by seat belts or air bags, it is likely that knees of passengers are struck by a cowl cross bar located below and inside a crash pad as well as a lower crash pad panel constituting a lower portion of the crash pad.

To prepare for such situation, a lower inner side of the crash pad is typically provided with a knee bolster that is a device for protecting knees in order to reduce knee injury value of passengers.

As prior art related to knee bolsters, Korean Laid-Open Patent Publication No. 10-2005-0027544 (Mar. 21, 2005) discloses a device for protecting knees, constituted by forming an outer panel made of plastic material into a U-shaped form, forming an inner panel made of steel material into a U-shaped form, installing the panels to form a space portion inside the outer panel, and installing a shock absorbing member that can absorb shock in the space portion.

However, since brittleness of the outer panel made of plastic material is high compared to load and knee penetration amounts that are generated upon collision, sharp edges that can rather cause injury to the knee may occur when it is broken. In addition, the inner panel made of steel material may rather interfere with inducing sufficient deformation of the shock absorbing member.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a knee bolster device for a vehicle, which is capable of enhancing passenger safety performance by minimizing injury to passengers when a collision occurs.

In one aspect, the present invention provides a knee bolster device for a vehicle, comprising: a left support bracket which is installed on one side end of left and right side ends of a vehicle body structure placed behind a lower crash pad panel configured to be struck by knees of a passenger when a collision occurs; and a shock absorbing foam which is installed so as to be supported by a right support bracket installed on the vehicle body structure at the right side of the left support bracket, wherein a lower portion of the lower crash pad panel is provided with a composite material integrally formed with the lower crash pad panel to reinforce strength, the composite material being arranged at a zone between the left support bracket and the shock absorbing foam.

In a preferred embodiment, the right support bracket is bent so that an upper side of the right support bracket is open, and the right support bracket is disposed on a lower portion of the vehicle body structure; a front portion of one end of the right support bracket is joined to the vehicle body structure and a rear portion of the other end is installed to the vehicle body structure without being joined to the vehicle body structure; and the rear portion is fastened to a rear support bracket coupled to the vehicle body structure so that the rear portion of the right support bracket is supported.

In another preferred embodiment, the front portion of the right support bracket is provided with foam guides formed to protrude toward the lower crash pad panel to guide assembly position of the shock absorbing foam and simultaneously prevent abnormal deformation of the shock absorbing foam, which is generated when vehicle collision occurs.

In still another preferred embodiment, the left support bracket is bent so that an upper side of the left support bracket is open, a front portion of one end of the left support bracket is fastened to a main crash pad panel disposed to be fixed to an upper side of the lower crash pad panel, and a rear portion of the other end is joined to the vehicle body structure.

In yet another preferred embodiment, the rear portion of the left support bracket is provided with one or more curved portions formed in a shape of being bent and convex for inducing deformation when it is struck, In order to reinforce strength, opposite edge portions of the left support bracket are provided with stepped portions that are bent to have a height difference compared to a central portion based on a width direction of the left support bracket.

In still yet another preferred embodiment, when the lower crash pad panel is injection molded, injection base material is coated up to a top end of a flange bent at an edge of the composite material, so that the top end of the flange is coated with the injection base material.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
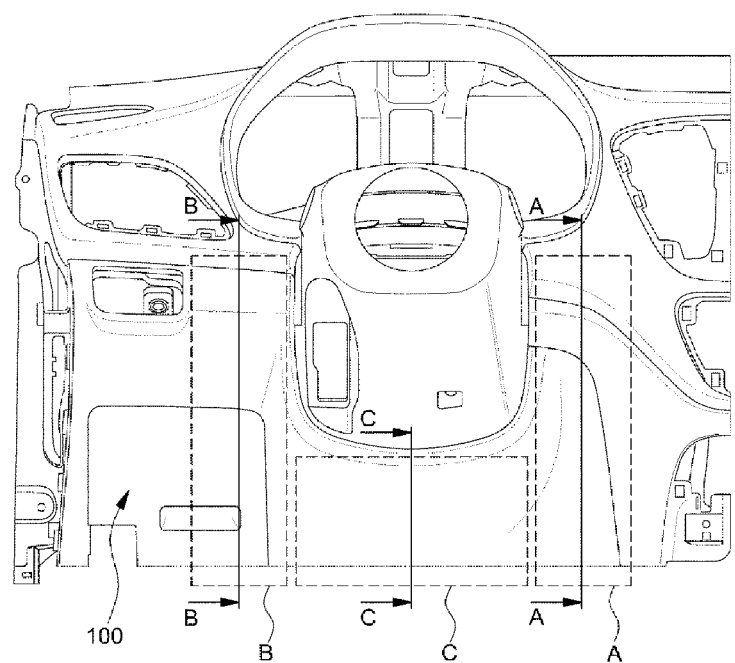
FIG. 1 is a view illustrating a lower portion of a crash pad having a knee bolster device for a vehicle according to an embodiment of the present invention installed in its inner space, as seen in front of the lower portion of the crash pad.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a view illustrating a lower portion of a crash pad having a knee bolster device for a vehicle according to an embodiment of the present invention installed in its inner space, as seen in front of the lower portion of the crash pad. Referring to FIG. 1, an optimal structure for securing passenger safety performance by minimizing injury to passengers striking a lower crash pad panel 100 when a collision occurs will be described separately in zones A, B and C.

Figure 2:
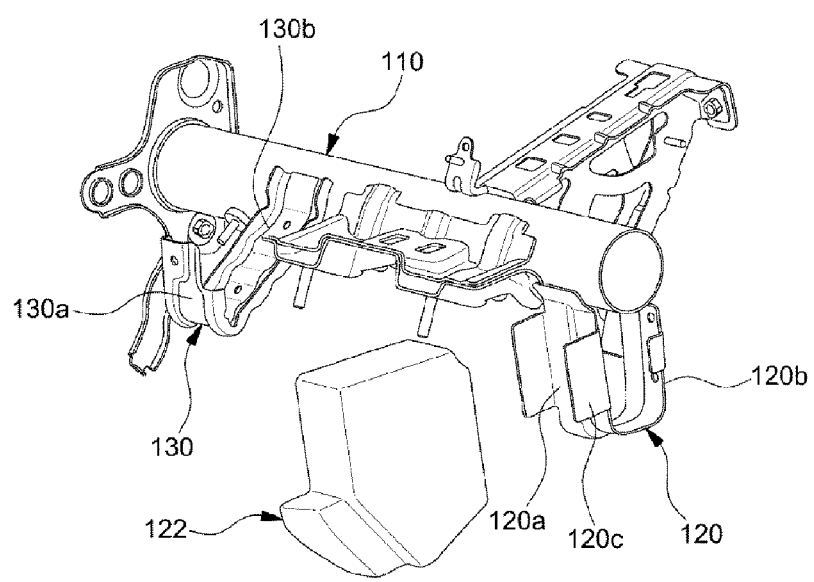
FIG. 2 is a perspective view illustrating some components of a knee bolster device for a vehicle according to an embodiment of the present invention.
Figure 3:
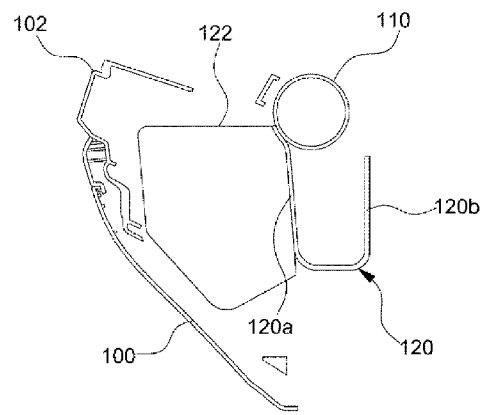
FIG. 3 is a cross sectional view taken along the line A-A of FIG. 1.
Figure 4:
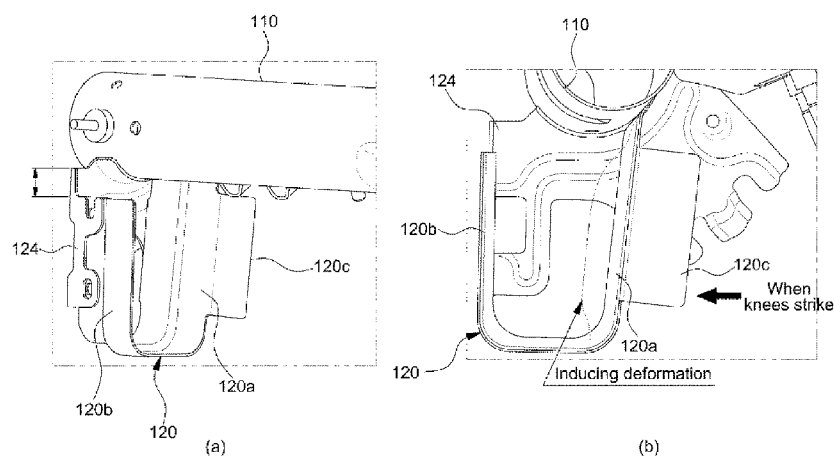
FIG. 4 is an enlarged view illustrating some components of a knee bolster device for a vehicle according to an embodiment of the present invention.

FIG. 2 illustrates components of a knee bolster device according to an embodiment of the present invention, which are attached to a vehicle body structure (e.g., cowl cross bar), with a lower crash pad panel omitted, FIG. 3 illustrates a sectional structure of a zone A taken along line A-A of FIG. 1, and FIG. 4 illustrates a structure for mounting a right support bracket which is attached to the vehicle body structure, viewed at the rear and from the side.

The vehicle body structure preferably is a cowl cross bar 110 which is elongated in the left-right direction of a vehicle body in front of the driver's seat of a vehicle. The cowl cross bar 110 is disposed behind the lower crash pad panel 100 on the basis of a direction of movement of passengers striking the lower crash pad panel 100 when a collision occurs.

The zone A in FIG. 1 is a zone which is struck by, in general, the right knee of the passenger when a collision occurs. The zone A is provided in its inner space with a right support bracket 120 installed to be joined to the cowl cross bar 110 and a shock absorbing foam 122 installed to be supported by the right support bracket 120, as seen in FIGS. 2 and 3.

Referring to FIGS. 2 and 4, the right support bracket 120 is formed to have U-shaped or ⊏-shaped section by bending its upper side to be open by pressing process, and disposed on a lower portion of the cowl cross bar 110 at the right side of a left support bracket 130 which is attached to the left end of the cowl cross bar 110, wherein a front portion 120a of one end of opposite ends thereof is installed to be joined to the cowl cross bar 110 by welding.

In particular, the front portion 120a of one end of opposite ends of the right support bracket 120 is joined and coupled to a lower front surface of the cowl cross bar 110 (i.e., front surface of a lower portion of a circular cross section of the cowl cross bar), while a rear portion 120b of the other end is separated with a certain interval from a lower rear surface of the cowl cross bar 110 (i.e., rear surface of the lower portion of the circular cross section).

Further, the rear portion 120b is fastened to a rear support bracket 124 which is joined and coupled to the cowl cross bar 110 beside the right support bracket 120, such that the rear portion 120b is supported.

In the right support bracket 120, only the front portion 120a is joined to the cowl cross bar 110, while the rear portion 120b is not joined to the cowl cross bar 110 but supported by the rear support bracket 124 in such a manner that its rearward pushing is inhibited, so that when the lower crash pad panel 100 is struck by the knee of the passenger, deformation of the right support bracket 120 is induced while the right support bracket 120 is pushed backward in a state that the front portion 120a is attached to the cowl cross bar 110.

Accordingly, since impact energy can be absorbed in a state that the right support bracket 120 is attached to the cowl cross bar 110, it is possible to increase absorption efficiency of absorbing impact energy (i.e., impact energy that can be applied to passengers in the event of a collision) by means of a shock absorbing foam 122.

In other words, with the structure in which the shock absorbing foam 122 is mounted by using the right support bracket 120, when the right knee of the passenger strikes and penetrates into the lower crash pad panel 100, deformation mode due to penetration amount, load and the like is optimized, and thus the absorption efficiency of absorbing impact energy is increased. Further, since the penetration amount of the passenger's knee is controlled by the right support bracket 120, it is possible to reduce pushing backward of the shock absorbing foam 122 properly and prevent the shock absorbing foam from being pushed backward when the shock absorbing foam 122 absorbs the impact energy caused by a collision.

The shock absorbing foam 122 is made from foam liquid of an expanded polypropylene (EPP) material in a block shape having a predetermined structure and size by foam molding process. When a collision occurs, the shock absorbing foam is deformed by the impact load of the passenger's knee penetrating toward the back side of the lower crash pad panel 100 while it absorbs the impact energy applied to the passenger striking the lower crash pad panel 100.

Further, the front portion 120a of the right support bracket 120 is provided with a plate-shaped foam guide 120c protruding toward the lower crash pad panel 100 at the left and right ends of the front portion 120a of the right support bracket 120.

The foam guide 120c guides assembly position of the shock absorbing foam 122 which is joined and coupled to the front portion 120a of the right support bracket 120 and at the same time serves to prevent abnormal deformation of the shock absorbing foam 122 which is intended to absorb impact energy in the event of a collision.

In a case where the form guide 120c is not arranged to the front portion 120a of the right support bracket 120, when a collision occurs, lateral torsion of the shock absorbing foam 122 occurs, and thus the shock absorbing foam 122 is separated from the right support bracket 120 or deformed abnormally.

Next, a structure for absorbing impact energy, which is installed in the inner space (i.e., space at the rear of the lower crash pad panel 100) of the zone B in FIG. 1, will be described.

Figure 5:
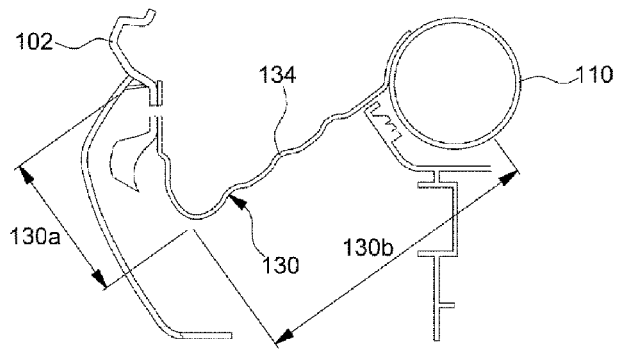
FIG. 5 is a cross sectional view taken along line B-B of FIG. 1.
Figure 6:
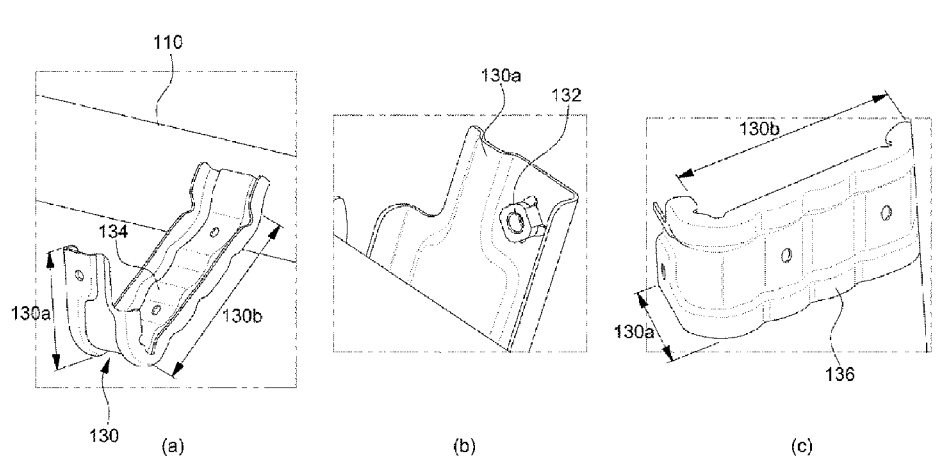
FIG. 6 illustrates partial views for explaining a structure of a left support bracket according to an embodiment of the present invention.

FIG. 5 illustrates a sectional structure of the zone B, viewed from line B-B in FIG. 1, and FIG. 6 illustrates partially a detailed structure of the left support bracket mounted to the left end of the cowl cross bar in FIG. 2.

The zone B in FIG. 1 is a zone which is struck and penetrated by, in general, the left knee of the passenger when a collision occurs. The zone B is provided in its inner space with the left support bracket 130 joined and coupled to the left side end of the cowl cross bar 110 with respect to a longitudinal direction of the cowl cross bar, as seen in FIGS. 2 and 5.

The left support bracket 130 is intended to tune a penetration amount and load balance of the left and right knees of the passenger striking the lower crash pad panel 100 when a collision occurs, wherein the left support bracket 130 is welded on an upper front surface of the cowl cross bar 110 (i.e., front surface of the upper portion of the circular section of the cowl cross bar) by $CO_2$ welding and the like.

Upon collision of the passenger's left knee, if the left support bracket 130 is excessively deformed, and thus the penetration amount of the left knee into the lower crash pad panel 100 is larger than that of the right knee, it is likely that rotational behavior of the passenger is caused, thereby increasing injury to the chest and legs.

Therefore, in order to control the penetration amount and load balance of the passenger's left and right knees, an excessive deformation of the left support bracket 130 is prevented and impact energy is absorbed by virtue of its proper deformation when a collision occurs.

To this end, as shown in FIGS. 5 and 6, the left support bracket 130 is bent so that the upper side of the left support bracket 130 is open to have a V-shaped sectional structure by a pressing process, wherein a front portion 130a of one end of the left support bracket 130 is fastened to a main crash pad panel 102 positioned and fixed on the upper side of the lower crash pad panel 100 through hardware for an assembly 132, such as a nut and the like, while a rear portion 130b of the other end is joined and coupled to the upper front surface of the cowl cross bar 110.

In particular, the hardware for the assembly 132 is joined and mounted to an inner surface of the front portion 130a, while the main crash pad panel 102 is disposed on the upper side of the lower crash pad panel 100 constituting a lower portion of a crash pad of the vehicle body, and constitutes an upper portion of the crash pad.

In addition, the rear portion 130b is provided with one or more curved portions 134 for inducing deformation when it is struck by the passenger's knees.

The curved portions 134 are processed to be formed in a shape of being bent and convex upward when pressing the left support bracket 130, and a plurality of curved portions 134 are arranged to be spaced apart with a certain interval along a length direction of the rear portion 130b (or along a direction of penetration of the passenger's knee).

The curved portions 134 have a structure that is bent side by side with respect to the direction of penetration of the passenger's knees, and thus they can be induced to be deformed in a direction of being struck upon penetration of the passenger's knees while being folded and crumpled.

At this point, the front portion 130a is disposed in a direction substantially perpendicular to the penetration direction of the knees, and the rear portion 130b is disposed in a substantially upward oblique direction with respect to the penetration direction of the knees, so that proper deformation is made by the curved portion 134 at the time of being struck by the passenger's knees.

In addition, the left support bracket 130 is provided with stepped portions 136 for reinforcing strength of opposite edges in order to secure adequate rigidity.

Each of the stepped portions 136 is provided as a form that opposite edges thereof have a height difference compared to a central portion on the basis of a width direction of the left support bracket 130. Referring to FIG. 6 (c), the stepped portions are formed in a manner that opposite edges are bent in a substantially ㄴ-shaped and projected form, as seen from a bottom surface of the left support bracket 130.

The left support bracket 130 functions to control the penetration amount of the passenger's left knee and prevent abnormal movement behavior of the passenger, and in turn prevent injury to the chest and legs of the passenger.

Next, a structure that the lower crash pad panel absorbs impact energy at the zone C in FIG. 1 will be described.

Figure 7:
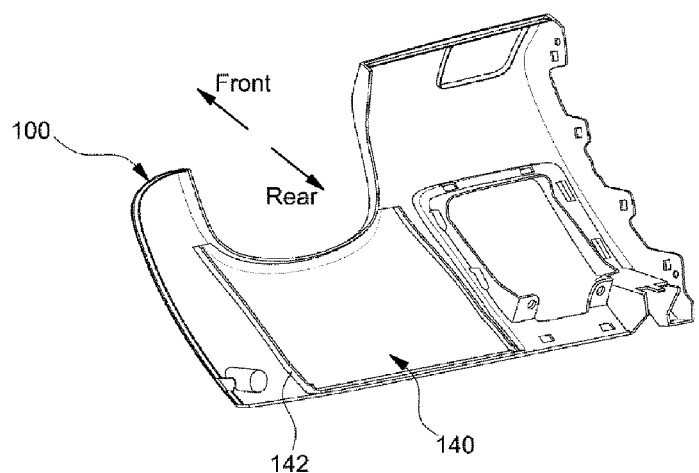
FIG. 7 is a view showing the inner side of a lower crash pad panel with which a composite material is molded integrally in accordance with an embodiment of the present invention.

FIG. 7 illustrates an inner side surface (back side) of the lower crash pad panel 100 which is not shown in FIG. 2. Referring to FIG. 7, as a front space of the lower crash pad panel shown in the figure is a space where a passenger (driver) is seated, the passenger's knees are positioned in front of the lower crash pad panel 100. A rear space of the lower crash pad panel 100 is provided with a shock absorbing structure such as the right support bracket 120 installed on the cowl cross bar 110, the shock absorbing foam 122, the left support bracket 130 and the like as described above.

Figure 8:
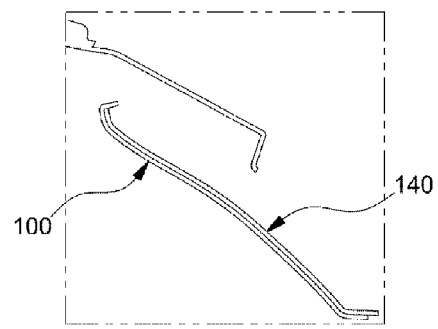
FIG. 8 is a cross sectional view taken along line C-C of FIG. 1, illustrating a sectional structure of a lower crash pad panel with which a composite material is molded integrally.
Figure 9:
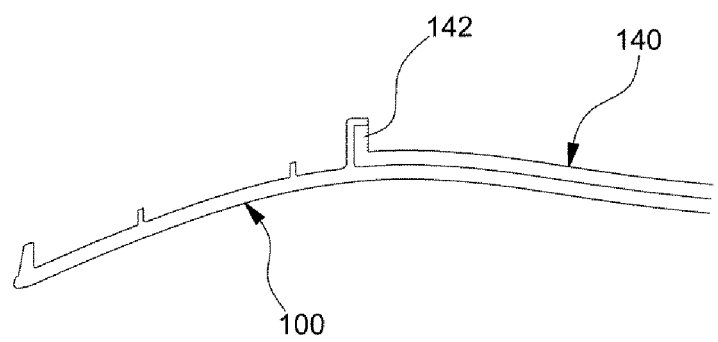
FIG. 9 is a view illustrating the state that an injection base material of a lower crash pad panel is coated up to a top end of a flange of a composite material in accordance with an embodiment of the present invention.

FIG. 8 illustrates a sectional structure of the zone C, viewed from line C-C in FIG. 1, and FIG. 9 illustrates a structure that injection base material is coated up to the top end of a flange of a composite material when the lower crash pad panel is injection molded, using the composite material as an insert material.

The zone C in FIG. 1 is a zone between the passenger's left and right knees that will penetrate into the inner space (i.e., rear space) of the lower crash pad panel 100, and corresponds to a lower central portion of the lower crash pad panel 100 as well as a middle portion between the left support bracket 130 and the shock absorbing foam 122.

The central portion of the lower crash pad panel 100, which corresponds to the zone C, is provided with a composite material 140 formed integrally to reinforce strength, as seen in FIGS. 7 and 8.

In other words, a lower portion of the lower crash pad panel 100 is provided with the composite material 140 integrally formed with the lower crash pad panel 100 to reinforce strength, and the composite material 140 is arranged at a middle zone between the left support bracket 130 and the shock absorbing foam 122.

As the composite material 140, it is possible to use a continuous fiber reinforced thermal plastic (CFT) composite material that can increase rigidity of the lower crash pad panel 100.

The CFT is a composite material consisting of continuous fibers and thermoplastics and it is manufactured by laminating the continuous fibers (filaments) in the thermoplastic material into a multilayer structure.

In other words, the CFT is a composite material manufactured by plaiting continuous fibers (filaments) and thermoplastics in the form of nets and weaving in the form of fabrics and then laminating the woven fabrics into a multilayer structure, which can increase rigidity of the lower crash pad panel 100 by being inserted into the lower crash pad panel.

As an example, glass fiber (GF), carbon fiber (CF) and the like may be used as the continuous fiber while polypropylene (PP), polyamide (PA), polyethylene terephthalate (PET) and the like may be used as the thermoplastic material.

The lower crash pad panel 100 may be manufactured with polymer materials such as polypropylene mineral filled (PPF) and the like by injection molding method, wherein the composite material 140, in which the continuous fibers are laminated into a multilayer structure, is used as an insert material and the composite material 140 and the lower crash pad panel 100 are integrally molded.

As shown in FIGS. 7 and 8, the composite material 140 is integrally molded on the lower inside surface of the lower crash pad panel 100.

Since the lower crash pad panel 100 is injection molded using such composite material 140 as an insert material, load generated on the left and right legs of the passenger is uniformly distributed, and dispersion of impact transmitted to the passenger's knees is absorbed when the passenger's knees strike the lower crash pad panel 100 due to occurrence of a collision, and also the penetration of the passenger's knees into the rear side (i.e., inner space) of the lower crash pad panel 100 is inhibited.

In addition, since the composite material 140 reinforces and thus increases rigidity of the lower crash pad panel 100 and can also give a function of an existing knee bolster panel made of steel material, i.e., a function of inhibiting penetration of the passenger's knees, it is possible to remove the existing knee bolster panel, and obtain the effect of reducing weight accordingly.

Further, the human body may be injured or harmed by exposure of micro fibers which are impregnated in outer peripheral portions, i.e., edge portions of the composite material 140, which are formed by cutting the composite material due to the nature of the CFT. Accordingly, in order to avoid this, it is designed that when the lower crash pad panel 100 is injection molded, injection base material (i.e., injection solution) is applied up to the top end of the flange 142 which is bent and formed at the edge portion of the composite material 140 and thus the top end of the flange 142 is coated with the injection base material.

The flange 142 is bent and processed at substantially right angle at the edge of the composite material 140 processed in a plate-shaped form, molded integrally as an insert material with the lower crash pad panel 100, and forms a structure protruding backward on the inner side surface of the lower crash pad panel 100.

In a case of the composite material 140 having such a flange 142, in order to avoid the situation that micro fibers exposed to the outside at the upper end of the flange 142 are possibly harmful to the human body, a leak gap for injection base material is intentionally applied to a portion on which the flange 142 of the composite material 140 is positioned on a metal mold in which the composite material 140 is inserted when the lower crash pad panel 100 is injection molded. Accordingly, when being inserted into the metal mold, the injection base material flows beyond the flange 142 and is applied and coated up to the top end of the flange 142 where micro fibers are exposed, and in turn encloses the exposed fibers and prevents the micro fibers from being exposed to the outside.

The knee bolster device for a vehicle according to the present invention is capable of enhancing passenger safety performance in that injury to passengers striking the lower crash pad panel and penetrating into the inner space of the lower crash pad panel when a collision occurs is minimized by means of the lower crash pad panel reinforced by the composite material and an impact energy absorbing structure installed in the inner space of the lower crash pad panel.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

Although embodiments of the present invention are described in detail as above, it is apparent that the scope of the present invention is not limited to the embodiments described in detail and many variations and modifications made to the present invention by those skilled in the art using basic idea of the present invention as defined in the appended patent claims fall within the scope of the invention.

What is claimed is:

1. A knee bolster device for a vehicle, comprising:
    a left support bracket which is installed on one side end of left and right side ends of a vehicle body structure placed behind a lower crash pad panel configured to be struck by knees of a passenger when a collision occurs; and
    a shock absorbing foam which is installed so as to be supported by a right support bracket installed on the vehicle body structure at a right side of the left support bracket,
    wherein a lower portion of the lower crash pad panel is provided with a composite material integrally formed with the lower crash pad panel to reinforce strength, the composite material being arranged at a zone between the left support bracket and the shock absorbing foam, and
    wherein the right support bracket is bent so that an upper side of the right support bracket is open, and is disposed on a lower portion of the vehicle body structure; a front portion of one end of the right support bracket is joined to the vehicle body structure and a rear portion of the one end is installed to the vehicle body structure without being joined to the vehicle body structure; and the rear portion is fastened to a rear support bracket coupled to the vehicle body structure so that the rear portion of the right support bracket is supported.

2. The knee bolster device of claim 1, wherein the front portion of the right support bracket is provided with foam guides formed to protrude toward the lower crash pad panel to guide assembly position of the shock absorbing foam and simultaneously prevent abnormal deformation of the shock absorbing foam when a vehicle collision occurs.

3. The knee bolster device of claim 1, wherein the composite material is a continuous fiber reinforced thermal plastic (CFT).

4. The knee bolster device of claim 1, wherein when the lower crash pad panel is injection molded, injection base material is coated up to a top end of a flange bent at an edge of the composite material, so that the top end of the flange is coated with the injection base material.

5. The knee bolster device of claim 1, wherein the left support bracket is bent so that an upper side of the left support bracket is open, a front portion of one end of the left support bracket is fastened to a main crash pad panel disposed to be fixed to an upper side of the lower crash pad panel, and a rear portion of the other end is joined to the vehicle body structure.

6. The knee bolster device of claim 5, wherein the rear portion of the left support bracket is provided with one or more curved portions formed in a shape of being bent and convex for inducing deformation when the left support bracket is struck.

7. The knee bolster device of claim 1, wherein opposite edge portions of the left support bracket are provided with stepped portions that are bent to have a height difference compared to a central portion based on a width direction of the left support bracket so as to reinforce strength.

* * * * *